(12) United States Patent
Reichow et al.

(10) Patent No.: US 10,942,360 B2
(45) Date of Patent: Mar. 9, 2021

(54) FREE-VIEWPOINT COLLIMATED DISPLAY SYSTEMS FOR COLLIMATED EFFECTS

(71) Applicant: DISNEY ENTERPRISES, INC., Burbank, CA (US)

(72) Inventors: Mark A. Reichow, Valencia, CA (US); Thomas F. Laduke, Orange, CA (US); Quinn Y. Smithwick, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 38 days.

(21) Appl. No.: 16/245,723

(22) Filed: Jan. 11, 2019

(65) Prior Publication Data

US 2020/0089015 A1 Mar. 19, 2020

Related U.S. Application Data

(60) Provisional application No. 62/732,982, filed on Sep. 18, 2018.

(51) Int. Cl.
| | |
|---|---|
| *G02B 27/14* | (2006.01) |
| *G03H 1/00* | (2006.01) |
| *G09G 5/00* | (2006.01) |
| *G02F 1/1335* | (2006.01) |
| *G03B 21/56* | (2006.01) |

(Continued)

(52) U.S. Cl.
CPC ......... *G02B 27/148* (2013.01); *G02B 27/005* (2013.01); *G02B 27/30* (2013.01); *G03B 21/56* (2013.01)

(58) Field of Classification Search
CPC . G01S 11/12; G01S 1/02; A61B 3/113; A61B 3/1225; A61B 3/103; B60R 1/00; A01B 69/001; G02B 27/144; G02B 27/0172; G02B 27/145; G02B 27/1013; G02B 27/0149; G02B 27/0103; G02B 27/0101; G09G 3/003; H04N 7/18;
(Continued)

(56) References Cited

U.S. PATENT DOCUMENTS

| | | | |
|---|---|---|---|
| 6,318,868 B1 * | 11/2001 | Larussa | G02B 30/56 359/857 |
| 2003/0035085 A1 * | 2/2003 | Westort | G02B 30/56 353/10 |

(Continued)

*Primary Examiner* — Dawayne Pinkney
(74) *Attorney, Agent, or Firm* — Snell & Wilmer L.L.P.; Kent A. Lembke

(57) ABSTRACT

Display systems for achieving collimated projection effects. For example, in a theatrical or concert installation, display systems can be used to project images of scenery that appear to be vast and at a great distant behind the viewing window. The system may include a flat panel display, a corrective mirror, and a concave mirror positioned for viewing by an observer. The corrective mirror pre-warps an image generated by the flat panel display and reflects the undistorted image onto the concave mirror such that the observer perceives the image generated by the flat panel display as being at a large distance. The corrective mirror does not distort with changes in viewpoint. In another implementation, the system may include a short throw projector generating an image, a free-form projection screen, and a concave mirror positioned for viewing by many observers through a viewing window.

29 Claims, 7 Drawing Sheets

(51) Int. Cl.
   *G02B 27/00*   (2006.01)
   *G02B 27/30*   (2006.01)
(58) Field of Classification Search
   CPC ..... G06T 19/00; G06T 19/006; G05D 1/0038; G05D 1/0246
   USPC ............ 359/629–636, 639, 13–14; 345/7–9, 345/632–633, 207; 349/11; 351/210, 351/200, 221
   See application file for complete search history.

(56) References Cited

U.S. PATENT DOCUMENTS

| | | | |
|---|---|---|---|
| 2003/0076423 A1* | 4/2003 | Dolgoff | H04N 13/305 348/222.1 |
| 2005/0057788 A1* | 3/2005 | Cobb | G02B 17/08 359/7 |
| 2013/0120362 A1* | 5/2013 | Harris | H04N 13/363 345/419 |
| 2016/0041390 A1* | 2/2016 | Poon | G02B 17/08 345/8 |
| 2016/0357094 A1* | 12/2016 | Ishii | G03B 21/208 |
| 2017/0154945 A1* | 6/2017 | Shin | H01L 27/3276 |
| 2017/0176744 A1* | 6/2017 | El-Ghoroury | G02B 5/10 |
| 2018/0149862 A1* | 5/2018 | Kessler | G02B 27/30 |

* cited by examiner

FREE-VIEWPOINT COLLIMATED DISPLAY SYSTEMS FOR COLLIMATED EFFECTS

CROSS REFERENCE TO RELATED APPLICATIONS

This application claims the benefit of U.S. Provisional Application No. 62/732,982, filed Sep. 18, 2018, which is incorporated herein in its entirety.

BACKGROUND

In today's technological environment, collimated displays are used in flight simulators to provide pilots with a realistic virtual environment to train in. These displays work by fitting an image onto a spherical mirror placed in front of the viewer. The image is generated by an out-of-view projector, which projects onto a screen, and the images thereon are reflected by the spherical mirror and made visible. The light for the reflected images is directed towards the observer in a collimated manner. When reflected light is collimated, depicted images appear focused at "infinity" with fully relaxed eye accommodation, and a viewer's eye viewpoints are parallel with zero vergence. As such, the viewer perceives the reflected images as a large distant vista and as expansive scenery. Such an effect can provide realistic depictions of, for example, a runway trailing off into the horizon or a panorama of the night sky.

For most collimated displays, all viewpoints are the same, and, as such, multiple viewers see distant objects at the same visual angle. This is important in cross-cockpit displays, where the seated pilot and co-pilot must agree on the direction of simulated scenery or distant objects contained therein. However, for certain visual installations where observers are given the freedom to move and look around from different viewpoints, realism, believability, and accurate portrayal of a depicted scene may require greater attention to such effects as parallax and the like.

Embodiments described herein address these problems and others, individually and collectively.

SUMMARY

Briefly, a free-viewpoint, collimated light display system is taught that is useful for providing collimated projection effects while requiring a much smaller amount of space (e.g., a 1 to 3 foot side profile or the like). The system includes a viewing space in which observers are free to move among a plurality of viewing positions. The system further includes a display device, a primary mirror with a concave reflective surface facing the display device, and a viewing window disposed between the concave reflective surface of the mirror and the viewing space. In the system, the mirror is positioned for viewing by the observers through the viewing window. Also, light for an image generated by the display device is reflected off of the concave reflective surface towards the viewing window as substantially collimated light.

In some embodiments of the system, the display device is a flat panel display. In some cases, the flat panel display is a flexible flat panel display having a free-form shape. In other cases, the display system may include a correction mirror positioned between the flat panel display and the mirror, and the flat panel display may have a flat or cylindrical display surface. Then, a convex reflective surface of the correction mirror receives the light for the image generated by the flat panel display and reflects light toward the concave reflective surface of the mirror with an added field curvature based on a shape of the concave reflective surface of the mirror. Still further, it may be useful that the convex reflective surface of the correction mirror has a shape that is aspherical, paraboloid, hyperboloid, or free-form.

In some cases, the display system may instead include a corrective lens positioned between the flat panel display and the mirror. In such embodiments, the corrective lens may receive the light for the image generated by the flat panel display and focus light toward the concave reflective surface of the mirror into a curved image plane matching a focal surface of the concave reflective surface of the mirror.

In other embodiments of the display system, the display device includes a projection screen and a projector projecting the light for the image onto the projection screen for diffusing prior to striking the concave reflective surface of the mirror. Then, the projection screen can be a free-form projection screen with a prescriptive curve configured to match a shape of the focal surface of the mirror. In this and other projection screen-based embodiments, the projection screen may preferably be a high-gain screen. To provide a small profile (or volumetric requirement) for the display system, the projector often will be a short-throw projector, and the display device includes an aspherical or free-form lens or mirror for distorting the light for the image prior to receipt by the projection screen.

A correction plate can be disposed between the concave reflective surface and the viewing space to correct for aberrations in the display system. For example, the correction plate may include or be a Schmidt correction plate that is placed ahead of the center of curvature of the projection screen and of the center of curvature of the mirror. In other examples, a meniscus correction plate is disposed between the projection screen and the primary mirror so that the light for the image passes through the meniscus correction plate after being diffused from the projection screen and after being reflected by the concave reflective surface of the mirror prior to reaching the viewing window.

In some implementations, the display system may include a 3D Lenticular, varifocal, volumetric, multi-layer, light field or other autostereo display or projection at a focal surface adding dimensionality to a collimated scene at or near infinity. In these and other cases, the display device may include a 3D lenticular, fly eye, or light field display providing the light for the image and configured to control aberrations in the collimated light. It may be useful for the system to include one or more polarization selective mirrors and flipped pancake optics to inline fold an optical path of the light for the image and make the display system more compact. Additionally, it may be useful for the system to include a viewpoint tracker tracking the observer in the viewing space and, in response, modifying the light for the image.

During system operations, the light for the image passes through an aperture provided by the viewing window and towards the observer such that the observer perceives imagery generated by the display device as a scene existing behind the aperture. These display systems may use a Schmidt or meniscus corrector plate in a polarization pancake optics to correct for aberrations, enable a large window size for the aperture, and provide a plurality of undistorted viewpoints. Particularly, the display system may include a light field display in polarization pancake optics to account for spherical aberrations, enable a large window size for the aperture, and provide a plurality of undistorted view points.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

DETAILED DESCRIPTION

Embodiments described herein are related to visual systems and methods. For a visual installation, such as for a theatrical, concert, or other entertainment or amusement attraction, display systems can be used to project images behind windows or view ports depicting virtual environments and various visual effects. As described herein, some of these visual effects may pertain to an illusion of vastness and three-dimensional (3D) context, referred to as "parallax effects" for the purpose of this description. With changes in viewpoint, parallax appears consistent between a viewing window (or nearby physical objects) and a virtually portrayed object and is greater than the parallax between a viewing window (e.g., a 2 foot by 3 foot transparent pane of glass, plastic, or the like (or a viewing port with a somewhat larger or smaller surface area)) and the physical surface from which light for the portrayed object is reflected.

As previously mentioned, one way of achieving this effect is using a collimated display. Traditional collimated displays, however, are not always flawless solutions. In collimated displays, distortions between viewpoints are sometimes caused by inaccuracies in the collimating mirror, as well as from the overall display configuration. For example, aberrations can result from a shape of the display not conforming to a spherical mirror's focal surface, an off-axis position of the display device or projection surface (relative to the spherical mirror's optical axis), and/or a relatively large window aperture. In traditional collimated displays, viewers are typically seated at known stationary viewpoint locations, which allows distortions to be balanced between fixed viewpoints. However, such collimated displays are unsuitable when several viewpoints are desired and when viewers are expected to be able to move freely. A single viewer moving across the display would see the image warp and distort as they move. Similarly for multiple viewers, each viewer would see the image warp and distort in a different way as his or her viewpoint changes. Traditional collimated displays also require large projection set-ups, and working with a limited amount of space can add additional barriers against achieving the desired visual effect.

To address the above, various embodiments described herein relate to free-form surfaces, corrective optics, and/or programmable light fields to conform the shape of projected images to a primary mirror's focal surface (e.g., a mirror with a concave reflective surface facing the viewing window beyond which viewers are positioned in a viewing space where they are free to move about), especially for off-axis components, large window apertures, and/or shorter throw distance configurations. In some embodiments, appropriate 3D perspectives from multiple viewpoints can be achieved without the use of real-time viewpoint tracking of users, although in some configurations, a viewpoint tracker can be supplementarily included.

Figure 1:
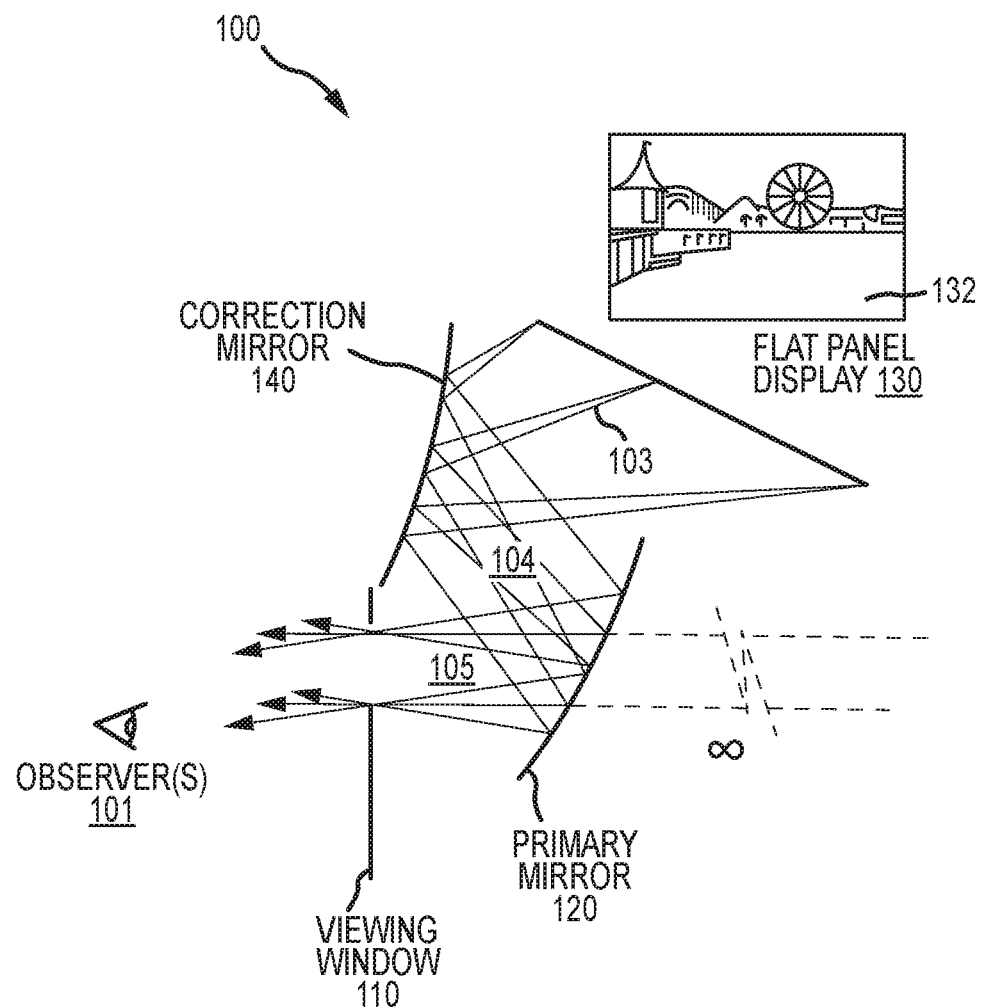
FIG. 1 shows a diagram of a display system according to one embodiment.

FIG. 1 shows a diagram of a display system according to one embodiment of the present description. Display system 100 may include a flat panel display 130, a correction mirror 140, a concave viewing mirror (herein referred to as a "primary mirror" with a concave reflective surface facing a viewing space) 120, and a viewing window 110 between the primary mirror 120 and the viewing space. In embodiments, the primary mirror 120 may be a spherical mirror and is sometimes referred to as such in this description.

As part of a visual installation, an observer 101 in a viewing space may experience images and effects provided by the display system 100 by looking through the viewing window 110. Through viewing window 110, observer 101 can receive light rays 105 reflected from primary mirror 120, which is configured to maintain the desired virtual scene. The viewing window 110 may include a substantially transparent piece of glass, plastic, or other sufficiently transparent material or simply be an opening in a wall with no material at all (with both being about 2 feet by 3 feet in size when rectangular or with a similar viewing area when of a different shape). The viewing window 110 can be made to appear the same as any other observation window one might encounter in the real world and can be used to give a notion of an external environment that the observer 101 is free to peer into, where the external environment is actually a virtual scene provided by the display system and its constituent parts.

In the display system 100, a primary mirror 120 is located in observer 101's line of sight through the viewing window 110 with its concave reflective surface facing the viewing window 110. Generated images are reflected from primary mirror 120 to observer 101 through the viewing window 110, so as to give the appearance of a scene existing behind the viewing window 110. In embodiments, reflected light rays 105 for the images are substantially collimated, and the term "substantially" is used to mean that the rays for a particular view direction are sufficiently parallel (i.e., do not diverge or converge or at least have low divergence (e.g., several milliradian or the like)) as it is known in the arts that no real light is perfectly collimated. With the collimated views reflected light 105, therefore, images portrayed by reflected light rays 105 may appear as coming from a distance much greater than the actual optical path length that they traverse (e.g., the images are focused at infinity as shown in FIG. 1 so that they appear to or are perceived by the viewer 101 as being stationary or as having no parallax (to be de-parallaxed)). As a result, a scene depicted by the light rays 105 will seem to exist well behind the primary mirror 120, and the scene may appear vast and distant enough to model the perceived visual qualities of real-life scenery.

For display system 100, a flat panel display 130 may be used to generate the images and transmit light 103 thereof. For example, the flat panel display 130 may be a light-emitting diode (LED) or an organic LED (OLED) display. In one implementation, the flat panel display 130 may include pixels that are pre-distorted along one axis (e.g., horizontally curved). A correction mirror 140 is used to reflect an image generated by the flat panel display 130 (and transmitted as light 103) onto the primary mirror 120 in a fitting manner as light 104. For example, the correction mirror 140 can be used to curve or warp a flat image so that it "fits" the primary mirror 120 and appears clear to the observer 101.

The correction mirror 140 can be a convex mirror (have a convex reflective surface facing the display surface of the display 130). In one embodiment, the correction mirror may be aspherical or free-form. For example, the correction mirror 140 may be an anamorphic mirror that pre-warps a reflected image in both x and y directions. In other implementations, the shape of the correction mirror can be paraboloid or hyperboloid. In embodiments, the flat panel display 130 and correction mirror 140 may be situated below or above the space between the viewing window 110 and the primary mirror 120 and be out of the observer 101's field of view when he or she looks through the viewing window.

Light 103 for an image generated and displayed by flat panel display 130 reflects off of correction mirror 140. Due to the shape of the correction mirror 140, the light 104 reflected off of the correction mirror 140 diverges towards primary mirror 120. In embodiments, the shape of the correction mirror 140 may be selected based on the shape of the primary mirror 120. For example, to produce collimated reflection (e.g., substantially collimated light 105) from the primary mirror 120, the desired shape of the corrective mirror 140 can be determined based on the curvature of primary mirror's focal surface 120. For the purposes of this description, the correction of light 103 to light 104 is referred to as a modification of wavefront shape.

Upon the modification of wavefront shape, light 104 then diverges towards the primary mirror 120, and collimated light 105 is reflected directly towards the observer 101 through viewing window 110 to provide the virtual scene in an undistorted manner. In some embodiments, an apparent distance for any depicted object in the virtual scene can further be achieved using additional visual cues that are often used to communicate depth and position of objects, such as the relative size of various objects depicted.

In one embodiment, an additional or alternative optical element can be used to introduce curvature in images and conform them to the focal surface of primary mirror 120 (e.g., see FIG. 6 described in greater detail later in the description). Such an optical element may allow a flat display 130 with high-contrast and low black levels (such as an OLED display) to be used in the collimating display system, while still providing an undistorted wide collimated view. For example, a lens with a focal length f and an index of refraction n has a Petzval curvature, Rp, where Rp=−f·n. A lens (or a partial offset section thereof), with an optical center located at the center of curvature of the primary mirror 120 and at the viewing window 110, can be used to reimage a flat display 130 to a curved surface located and conformal to the primary mirror 120's focal surface. For the purpose of this description, optical elements used to conform or modify a wavefront shape to fit an image onto primary mirror 120 can be referred to as "optical correction components."

In another alternative embodiment, a fly-eye display (also referred to as an integral imaging display) or light field display can be used to generate the appropriate luminance and direction of rays from each point on the display surface 132 of flat panel display 130. As a result, after being reflected by the primary mirror 120, light rays 105 may have the desired luminance for their direction when passing through viewing window 110. The light field display effectively accounts for (i.e., precorrects) the aberrations of the primary mirror 120, such that a collimated image does not distort with changes in viewpoint, even for an offset and/or large aperture viewing window 110.

It should be understood, that the term "flat panel display" may apply to a variety of thin display devices for viewing content, as understood in the art and as used in the description herein. A "flat panel" commonly refers to a display panel that is usually much thinner and lighter than a cathode ray tube (CRT) television. Examples include plasma screen, liquid crystal display (LCD), LED, and OLED display devices to name a few. As previously mentioned, a flat panel display may have a curved shaped (have a curved surface 132). In some instances, a flat panel display may take a free-form shape. For example, flat panel display 130 may be a flexible OLED display that has been formed or bended into the shape of a predetermined compound curve for the purpose of fitting images to the primary mirror 120.

Figure 2:
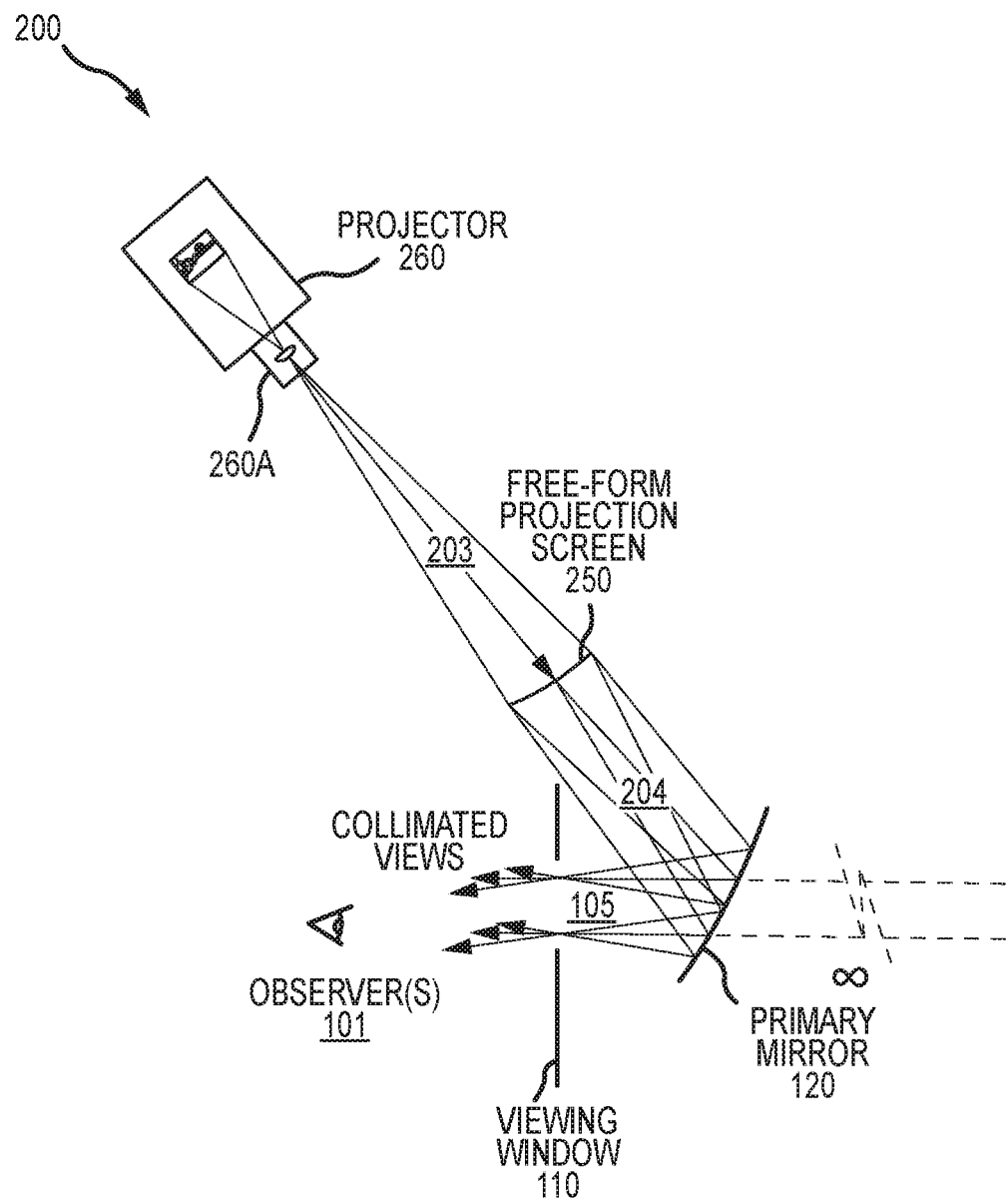
FIG. 2 shows a diagram of a display system according to another embodiment.

FIG. 2 shows a diagram of a display system 200 according to another embodiment of the present invention. Similar to system 100, the display system 200 includes the viewing window 110. The observer(s) 101 again sees images conveyed as collimated light rays 105 (e.g., low divergence but not perfectly collimated so "substantially" collimated light) reflected off of the primary mirror 120.

Display system 200 may include a projection set-up or assembly for generating and displaying images through the projection of light. The projection set-up can be below or above the space between the primary mirror 120 and viewing window 110 and out of observer 101's field of view. The projection set-up of display system 200 may include a projection screen 250 and a projector 260 (with the projection screen disposed between the projector 260 and the concave reflective surface of the primary mirror 120). In one embodiment, rear projection may be used to form an image onto the projection screen 250 (as depicted). In another embodiment (not shown but understood by those in the art), front projection may be used in the system 200. The projection screen 260 may be a high-gain screen. Typical screens diffuse light 204 in all directions whereas a high-gain screen may be used (sometimes with a focusing lens such as a large Fresnel lens positioned proximate to the surface of the screen 250) to redirect light 204 onto the mirror 120. A high-gain screen may be used in this embodiment of system 200 and all others discussed herein in which a projection screen is utilized in the display system.

In various implementations, the projector 260 may be, for example, a 4K, high dynamic range (HDR) or other "high definition" or "ultra-high definition" projector commonly known in the art. In some implementations, the projector 260 can be a short-throw or ultra-short-throw projector capable of projecting a substantially large image onto a projection surface that is closely situated in front of it. Short-throw/ultra-short projectors often have a projector lens that compensates for distortion and defocus that would otherwise occur from a short optical path between the projector lens and the projection screen 250 (and to account for fact that many such projectors are designed to project onto flat screens rather than the concave reflective surface of primary mirror 120).

In certain embodiments, the throw ratio of projector 260 may be between 0.38:1 and 1.4:1 or, in some implementations, can even be less than or equal to 0.37:1. Projection screen 250 may be any suitable projection screen for directing light in a sufficiently clear and bright manner to form an image thereon, as known by those in the art. The projection screen 250 can be a high gain projection screen. As an example, the projection screen 250 may have a gain that is between 1.1 and 3.0. As another example, the projection screen 250 may have a gain that is between 3.0 and 6.0. It should be understood that any suitable screen may be chosen based on the desired brightness of the image and configuration of the display system 200.

In embodiments, projector 260 may include a free-form or aspherical lens 260A. In some implementations, the lens 260A is a free-form lens customized for the projection set-up. For example, the shape of the free-form lens 260A may be determined based on the dimensions of the display system 200, the position of display components relative to one another, and the light reflectance properties of the projection screen 250 and/or of primary mirror 120. In one embodiment, the free-form lens 260A may be an anamorphic lens that distorts light 203 for a generated image in both horizontal and vertical directions.

Light 203 for a generated image may pass through aspherical/free-form lens 260A and may be transmitted/projected onto projection screen 250. Light 204 then forms onto and scatters throughout projection screen 250, and its reflection off of the primary mirror 120 depicts the desired scene for the observer(s) 101 via window 110. The desired projection screen 250 can be selected and/or manufactured based on one or more angles or relative positions between the projection set-up and the primary mirror 120. In one embodiment, the projection screen 250 may have a shape that is configured to match, or that is based on, the shape of the primary mirror's focal surface. For example, projection screen 250 may have a prescriptive curve (e.g., a free-form shape) that is based on half the radius of curvature of the primary mirror 120. In this manner, light 204 scattering from the projection screen 250 may be reflected and properly collimated by the curved surface of the primary mirror 120 according to the offset positions of the projection set-up and/or the dimensions of the viewing window 110 and its aperture.

The angle at which light 204 scatters off of the projection screen 250 and onto the primary mirror 120 may be set as an angle at which light 105 will appear to focus at or emanate from an infinite or nearly infinite point behind the primary mirror 120 relative to the viewing window 110 (and images perceived to be stationary to viewer 101 even when they move in the viewing space to have differing viewpoints via the window 110). For a given aperture offset and dimensions, an optical ray-tracing algorithm or software suite (e.g., software products for ray tracing available from Zemax LLC or the like) can be used to calculate where the collimated beams of particular view angles are focused by the primary mirror 120. A spline surface may be fitted to these coordinates of this focal surface and then be fabricated (e.g., using 3D printing, milling, or the like) either as a projection screen or as a buck or mold that a suitable projection screen material may be slumped, vacuum formed, or molded from as appropriate.

However, in some instances, with increasing aperture offset and/or dimensions, the rays of a given view direction may not be produced by the same point on the focal surface. This may be due to a spherical shape of the primary mirror 120 and inherent related aberrations. For small aberrations, the surface derived from the collection of smallest focal spots (circle of least confusion) or cross-sections of greatest energy density may be derived and used. Furthermore, spot sizes may be used to modify and blend image pixels. For window offsets and or dimension aberrations which are too large for use with the primary mirror 120, sections of optical correction plates (e.g., Schmidt correctors, meniscus correctors, or other corrective optical devices) may be placed at the offset window to correct for spherical and coma aberrations. With these aberrations corrected, the focal surface of the primary mirror 120 may be spherical.

Figure 3:
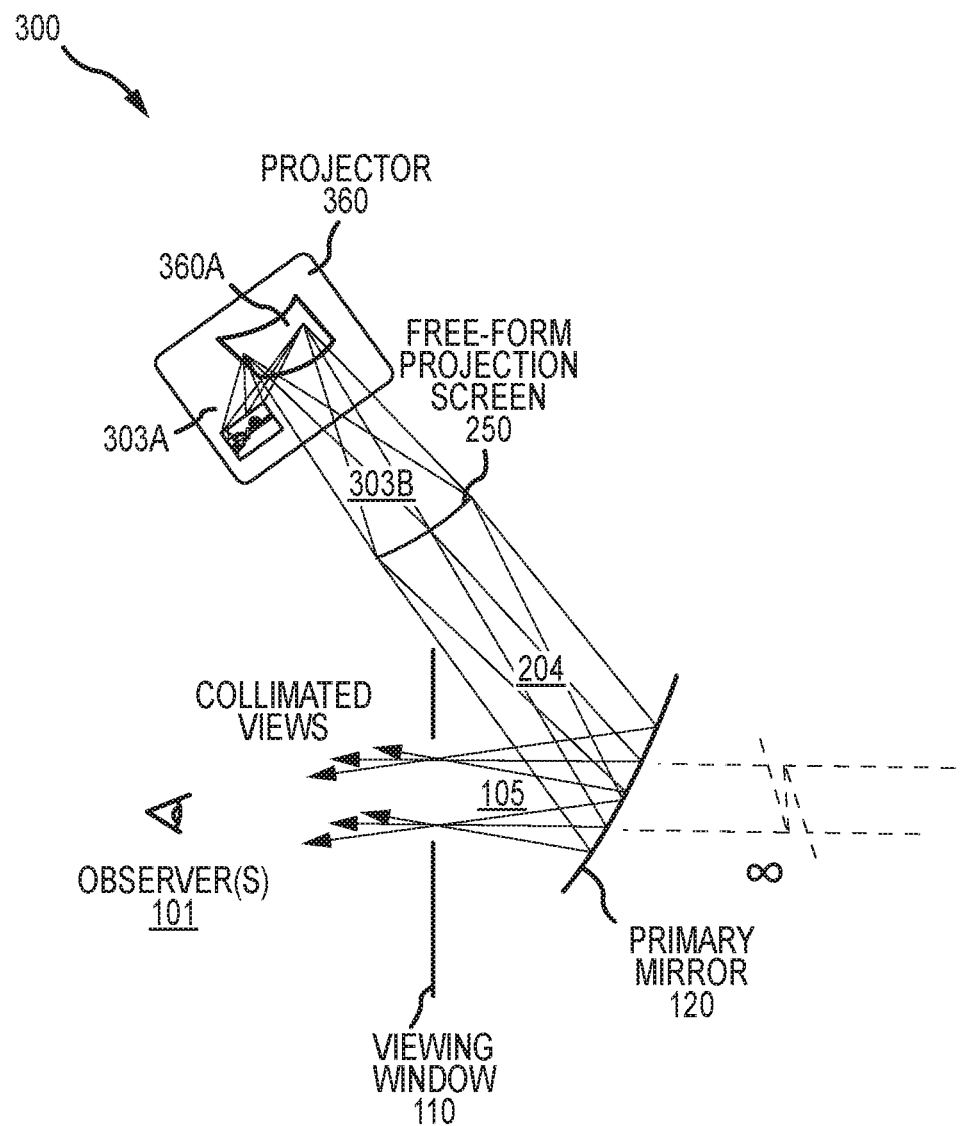
FIG. 3 shows a diagram of an exemplary display system according to yet another embodiment.

FIG. 3 shows a diagram of a display system according to yet another embodiment of the present invention. Similar to systems 100 and 200, display system 300 may include the viewing window 110 from which an observer 101 in a viewing space views scenes reflected off of the primary mirror 120. Similar to system 200, display system 300 includes a projection set-up, which may be hidden from view by the observer 101. Display system 300 includes a projector 360 and the projection screen 250. The projection screen 250 may be the same or a similarly designed projection screen as the one used in display system 200. In embodiments, the projector 360 may include one or more aspherical or free-form mirror(s) 360A. The aspherical or free-form mirror(s) 360A may allow for an ultra-short-throw distance to be achieved. For example, the throw distance of projector 360 may be less than 0.37:1. Some non-limiting examples of ultra-short-throw projectors suitable as projector 460 may include, for example, an Optoma ZH400UST projector or a BenQ MW955UST 3500-Lumen WXGA Ultra-Short throw DLP Projector.

According to embodiments, light 303A for an image generated by projector 360 may be reflected off of aspherical or free-form mirror(s) 360A. For example, light 303A may be projected through a lens that is facing directly towards aspherical or free-form mirror(s) 360A. The aspherical or free-form mirror(s) 360A may include one or more anamorphic mirrors. When light 303A is reflected off of the anamorphic mirrors 360A, the reflected light 303B may diverge in X and/or Y directions, so as to produce a pre-distorted image. In one embodiment, aspherical or free-form mirror 360A may be configured to have a shape that is based on the prescription of the primary mirror 120. For example, the shape of aspherical or free-form mirror 360A may be selected and determined based on the size and radius of curvature of primary mirror 120.

Due to the shape of aspherical or free-form mirror(s) 360A, light 303A may be reflected in a divergent manner as light rays 303B, so as to produce a pre-distorted image on projection screen 250. Light 303B from the pre-distorted image may form the image onto projection screen 250 and may then scatter as light 204 and reflect off of primary mirror 120. Light 105 reflected off of the primary mirror 120 towards the eyes of the observer 101 may be focused, via window 110, at an infinite or nearly infinite point behind the primary mirror 120. As such, the observer 101 may view a scene projected onto primary mirror 120 as resolving out into the distance behind viewing window 110 and, thus, giving depicted scenery appropriate parallax (e.g., no parallax or de-parallaxed), accommodation, and vergence cues for 3D spatial context and perceived depth.

The described embodiments generally do not affect the location of the collimating mirror's focal surface and the optimal location of the offset and large aperture window. However, the use of free-form projection surfaces, free-form optics, and correction plates to pre-warp/correct for aberrations may provide flexibility in creating virtual images of the display after the focal surface and/or may allow the viewing window/aperture to be moved to a closer location, thereby resulting in more compact display designs. The use of free-form projection surfaces, free-form optics, and correction plates described herein may also be combined with polarization techniques to fold the optical path inline to produce even more compact arrangements while increasing the aperture size and to produce bright undistorted imagery for many viewpoints over a wide field of view.

Pancake optics use polarization techniques to fold the optical path of a collimating display inline, thus reducing the volume and footprint of the display. Typically, light from a horizontally linearly polarized display passes through a 50/50 curved half-mirror (e.g., a partially-reflective spherical collimating mirror) and travels one half of the collimating mirror's focal length. The light then passes through a ¼ wave retarder polarizer film, which turns the horizontal linear polarized light into left circularly polarized light with half the light reflected back towards the collimating mirror by a flat half-mirror. The remaining light is absorbed by an orthogonal handed (right circular) polarizer after the flat half-mirror, and becomes the opposite handed right circularly polarized light.

The light again passes through the ¼ wave retarder polarizer film, turning the right circularly polarized light into vertically polarized light. The light travels a distance equal to half of the collimating mirror's focal length, which is reflected and collimated since the display is a total of one focal length away from the collimating spherical half-mirror, remaining vertically polarized. The light again travels a distance equal to half of the collimating mirror's focal length. The light then passes through a ¼ wave retarder polarizer film which turns the vertical linear polarized light into right circularly polarized light, with half the light passing through the right circular polarizer after the flat half-mirror and, typically, travelling another half focal length to the window aperture. As such, the pancake optic reduces the depth of the display by about half of the collimating mirror's focal length.

However, due to multiple passes through two half-mirrors (one spherical, one flat), the resulting collimated image may be dim (e.g., at most ¹⁄₁₆ the original brightness). To increase brightness, the curved half-mirror can be replaced with a polarization sensitive mirror (e.g., a wire grid polarizer), which reflects vertically polarized light and passes horizontally polarized light—avoiding the losses associated with a curved half-mirror. This increases the efficiency of the pancake mirror to about ¼ of the total light passing through the system. Unfortunately, it may be hard to conform polarization selective mirrors to a spherical, concave, or freeform surface without stretching or heating the material and, thereby, destroying the polarization selective properties. In this arrangement, the polarization selective mirror should be on the curved surface, as the polarization selective mirror can appropriately reflect or pass linearly polarized light.

To make a practical compact collimating display using pancake optics, the order of the polarization optics can be inverted, such that light enters circularly polarized and leaves linearly polarized, thereby allowing the use of a linear polarization selective mirror on the flat mirror rather than the curved mirror. Ideally, achromatic or broadband circular polarizers and achromatic or broadband ¼ wave retarders are used to achieve consistent polarization and retardation over the visible spectrum. If a polarization selective mirror that operates on circularly polarized (e.g., a chiral mirror) is used for the curved mirror in conjunction with the linearly polarization selective mirror on the flat mirror, efficiency can be further increased.

In some instances, there may still be a significant distance between the flat half-mirror and the ideal window aperture location at the spherical mirror's center of curvature. This portion of the optical path can be further folded inline by using a pancake optic of a circular polarizer, a flat half-mirror, a gap of ⅙$^{th}$ the spherical collimating mirrors radius, a ¼ wave retarder, and a polarization selective flat mirror. This may reduce the entire depth to about ⁵⁄₁₂ of the spherical collimating mirror's radius.

Some polarization selective mirrors may only work appropriately on linearly polarized light, passing one orientation and reflecting the other, due to their use of linear wire grid arrays or stretched polymer films. As such, circular polarization selective mirrors (chiral mirrors) may be used. The chiral mirrors use twisted liquid crystal films or metamaterials with spiral antenna arrays.

Another benefit of the pancake optic collimated display is that the window aperture may be located on-axis of the spherical collimating mirror. The on-axis configuration has less spherical aberration than an off-axis window aperture of the same size, allowing for larger window apertures and fields of view. However, the spherical aberration may still limit the window size (e.g., to about ⅕ the spherical mirror diameter), field of view, and viewpoints with acceptable distortion. It can be beneficial to add Schmidt, meniscus, or other corrector plates or a light field display to correct for spherical and other aberration(s). These may allow for large window aperture sizes, and many undistorted viewpoints, as well as a compact bright display.

Figure 4:
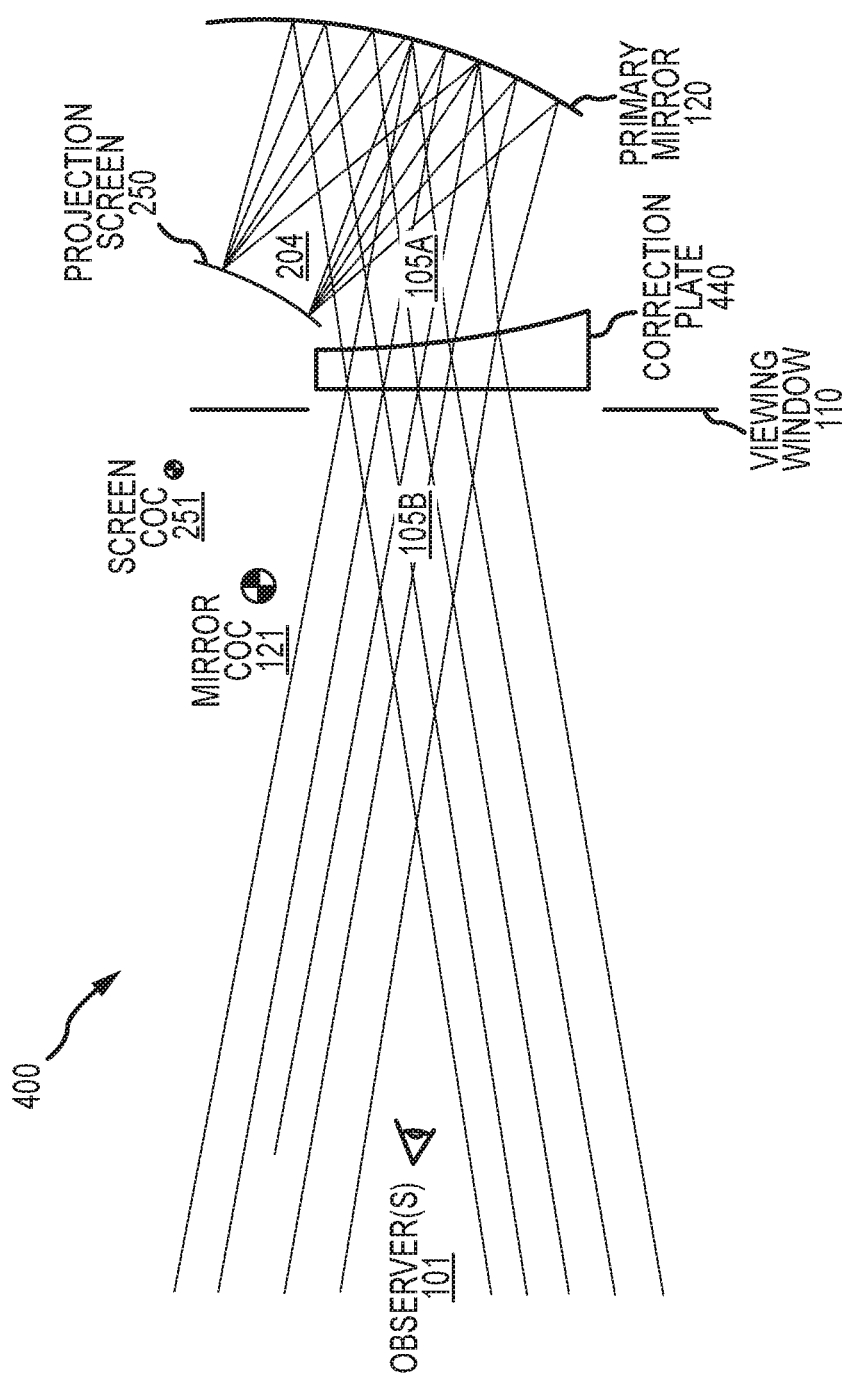
FIG. 4 shows an implementation incorporating a Schmidt correction plate.

FIG. 4 shows an implementation of display system 400 incorporating a Schmidt correction plate 440. In the configuration shown in FIG. 4, a display device (not shown but understood from FIG. 1) projects light for an image onto projection screen 250. Light 204 scattering from throughout projection screen 250 is reflected by a primary mirror (e.g., a concave collimating mirror) 120. The reflected light 105A then passes through a correction plate 440, which in one useful embodiment, may be a Schmidt correction plate, which may be positioned between the mirror 120 and the window 110 or may take the place of the window 110 in some cases. The correction plate 440 may correct for aberrations caused by the particular display configuration, such as by off-axis positions of components and by the dimensions of the viewing aperture provided by viewing window 110. The correction plate 440 may be placed just in front of the viewing window 110 (i.e., at the window aperture) proximate to the mirror 120. Furthermore, the correction plate 440 may be placed ahead of the screen center of curvature (COC) 251 and the primary mirror's center of curvature (COC) 121, as illustrated in the figure.

The shape of the correction plate 440 may be as shown or similar. In some embodiments, the shape may be configured based on the position of projection surface 250 and/or based on the focal surface of primary mirror 120. For example, one or more slopes of a receiving surface of the correction plate 440 may be adjusted/manufactured based on a relation between the position of the viewing window 110 relative to the screen and mirror COCs 251 and 121 (e.g., using a ray tracing process). The shape of the correction plate 440 may create a desired modification in wavefront shape for light that passes through it. In embodiments, light 105A reflected by mirror 120 passes through the correction plate 440, and the resulting light 105B is directed through window 110 towards the observer(s) 101 as light 105b that has been corrected (i.e., has the desired modification in wavefront shape). The modification may be such that light for the image may be collimated and focused at infinity for changing viewpoints around the display system and in a substantially undistorted and consistent manner. Thus, the correction plate 440 may act as an optical correction component and may provide greater clarity and realism for the image/scene depicted over a wide range of viewpoints.

Figure 5:
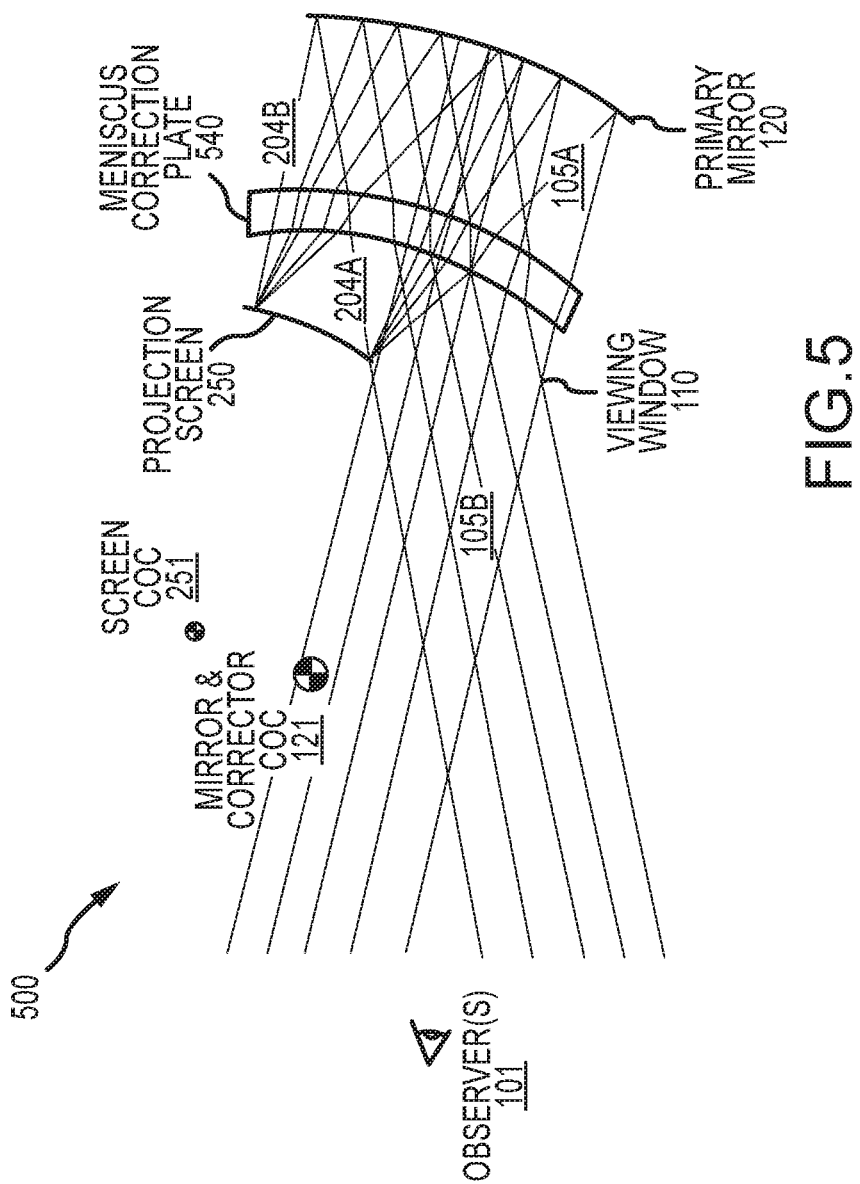
FIG. 5 shows an implementation incorporating a meniscus correction plate.

FIG. 5 shows an implementation of a display system 500 incorporating a meniscus correction plate 540. The configuration of system 500 shown in FIG. 5 may allow for a more simplistic correction plate 540 compared to that of system 400 of FIG. 4 (i.e., less complexity in shape configuration and/or manufacturing). In the configuration of FIG. 5, a display device (not shown) projects/transmits light for an image onto projection screen 250. Light 204A then scatters throughout surfaces of the projection screen 250 and through the correction plate 540, which in some embodiments of system 500 may be a meniscus correction plate. The correction plate 540 may be concentric with a primary mirror 120 in view of observer(s) 101. That is to say, the primary mirror 120 and correction plate 540 may share a COC 121 in the configuration. In some embodiments, the correction plate 540 may be an optical correction component used to modify the wavefront shape of light for a projected image/scene. Light 204B that passes through the correction plate 540 is reflected off of the primary mirror 120 towards the viewing window 110 as light 105A. The light 105A again passes through the correction plate 540 (e.g., through a lower half of the correction plate), such that the wavefront shape is once again modified before passing through the viewing window 110 as collimating light 1056 reaching the eyes of observer(s) 101.

Figure 6:
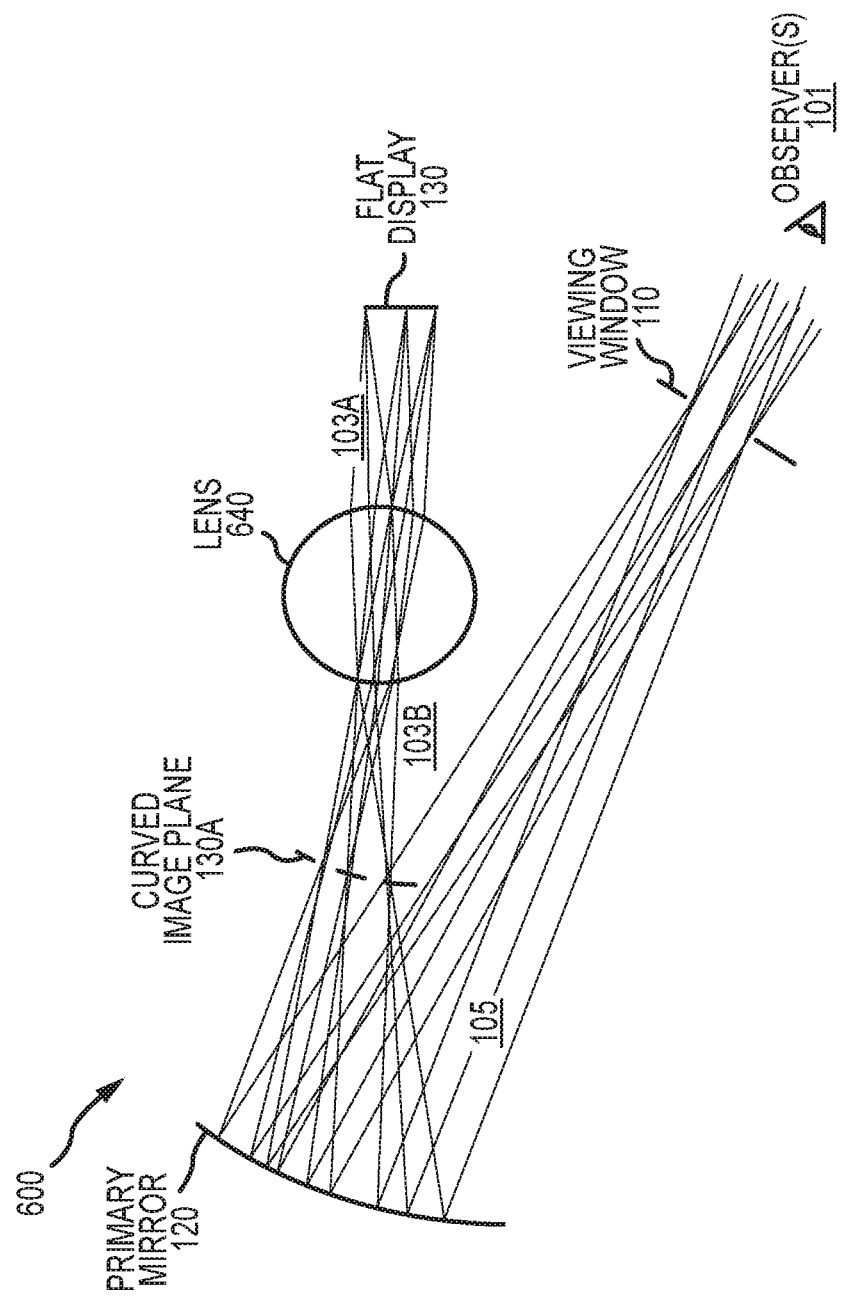
FIG. 6 shows an implementation incorporating a lens with a flat panel display configuration.

FIG. 6 shows an implementation of a display system 600 incorporating a lens 640 with a flat panel display configuration. The configuration of system 600 shown may serve as an alternative to display system 100 of FIG. 1. As shown, a flat display 130 generates an image, and light 103A for the image is transmitted in the direction of the primary mirror 120. Situated between the flat panel display 130 and the primary mirror 120 is a corrective lens 640. The corrective lens 640 warps the light 103A, such that the resulting light 103B forms a curved image plane 130A. The curved plane 130A forms an image that matches/fits the focal surface of the primary mirror 120. The resulting light 103B then reflects off of the primary mirror 120 in a collimating manner (as substantially collimated light). The collimated light 105 is directed through an aperture of the viewing window 110 and into the eyes of the observer(s) 101.

Figure 7:
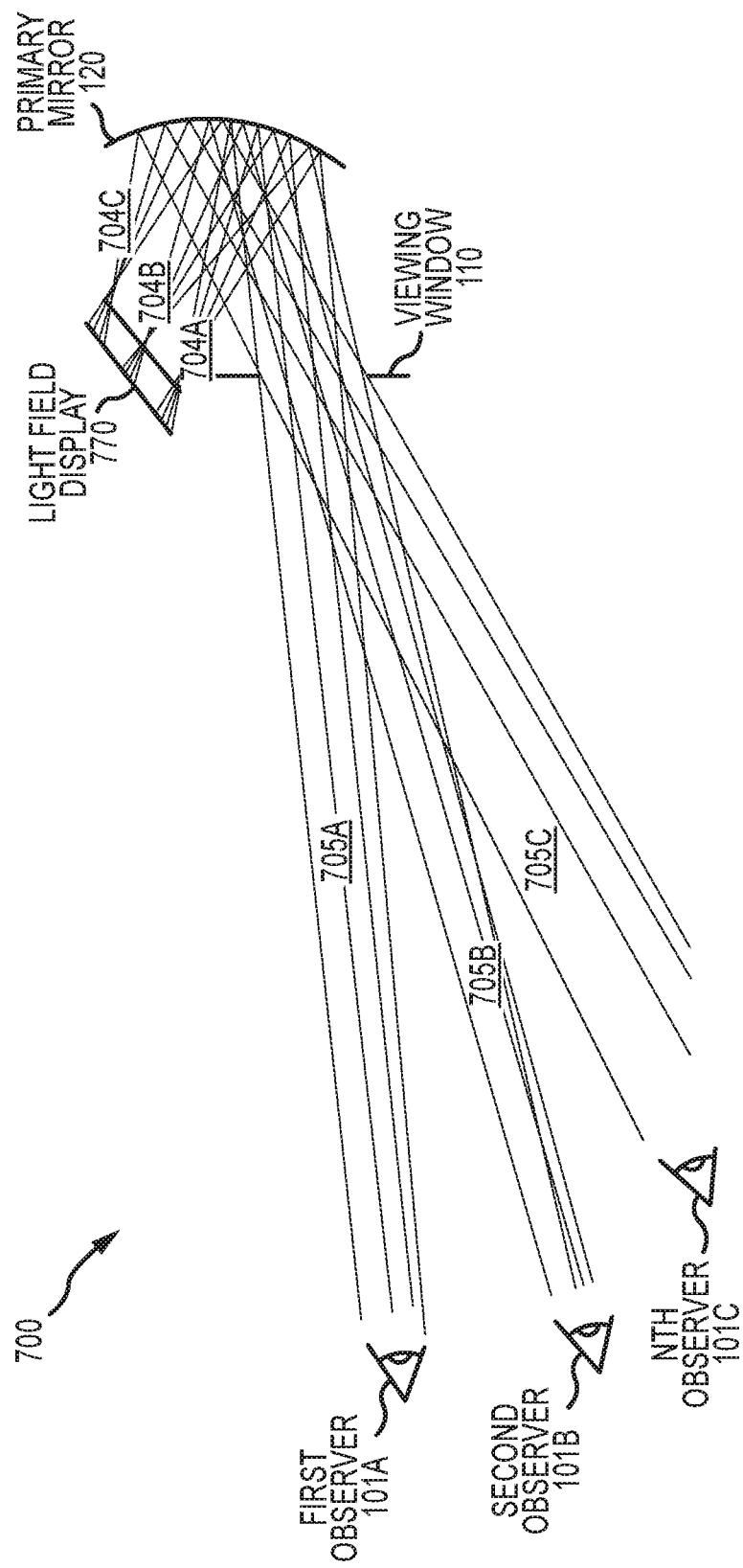
FIG. 7 shows an implementation incorporating a light field display.

FIG. 7 shows an implementation of a display system 700 incorporating a light field display 770. The display configuration for this implementation of system 700 includes a light field display 770, the primary mirror 120, and the viewing window 110. The light field display 770 may be a 3D display system that programmatically maps image samples to a designated point or light ray path in physical space. These designations may be expressed as vectors having an intensity/amount of light as well as direction. A set of vectors or vector functions used to form a given multi-perspective image in three-dimensional space may be referred to as a "light field." The light field display 770 may include a number of volumetric and/or holographic display systems, as known by those in the art.

In the configuration shown in FIG. 7, the light field display 770 generates and emits/transmits light for an image towards the primary mirror 120. In some embodiments, each set of light rays 704A, 704B, 704C is programmatically directed according to a pre-determined light field based on a plurality of known viewpoints and their relation to the primary mirror 120 and the aperture of viewing window 110. For example, these viewpoints may correspond to expected viewpoints of passing observers, such as first observer 101A, second observer 101B, and nth observer 101C. It should be understood that the light field display 770 may be configured/programmed to provide any number of viewpoints for any number of simultaneous observers, 1 thru N (e.g. 1, 2, 3, . . . 10, 11, 100 viewpoints, etc.).

As shown, in order to provide a given scene to the observers, the light field display 770 may emit light rays 704A, 704B, 704C, which may reflect off of the concave reflective surface of the primary mirror 120 and through the viewing window 110 to be directed towards the observers as light rays 705A, 705B, and 705C respectively. As such, images for a scene may be aligned to each observer's viewpoint of the scene. For example, rays 705A may align with an appropriate perspective that corresponds to first observer 101A's position relative to the viewing window 110 (and, therefore, the scene depicted behind it). Similarly, rays 705B and rays 705C may align with the appropriate perspective from second observer 101B's position and nth observer 101C's positions, respectively. Thus, a depicted scene may model the three-dimensional visual characteristics of real-life scenery and from all viewpoints around the visual installation.

According to embodiments, the systems described herein are well-suited for producing a collimated projection effect when given a small space for the projection set-up. As a non-limiting example, the projection set-ups may be positioned at a space between the viewing window 110 and primary mirror 120 that is less than 3 feet in distance. In some implementations, it may be possible for this distance to be less than 1 foot in length. Thus, embodiments of the present invention can be used for a "virtual window" effect for a hallway, corridor, or other small passageway or compartment through which observers may pass and view a deep virtual scene provided by the display system.

In some embodiments, depth may be added to any of the display systems described herein by modifying the display system to be or include a multiplane display assembly. For example, a transparent display may be inserted between the concave reflective surface of the primary mirror and the viewing window to display additional imagery that will appear to be located between the viewing space (viewing position of the observer) and the images displayed by light reflected from the primary mirror (which are focused at infinity or at some distance behind the primary mirror). In another example, the primary mirror may be a transparent mirror and physical or virtual set pieces and/or scenery may be positioned behind the mirror (e.g., distal to the viewing space such that the primary mirror is disposed between the viewing window and the physical and/or virtual set pieces and/or scenery).

The figures are described in greater detail in the description and examples below, are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and implementations, it should be understood that the various features, aspects, and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment.

Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide illustrative instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. Additionally, the various embodiments set forth herein are described in terms of example block diagrams, flow charts, and other illustrations. As will become apparent to one of ordinary skill in the art after reading this document, the illustrated embodiments and their various alternatives may be implemented without confinement to the illustrated examples.

What is claimed is:

1. A display system for providing collimated projection effects, comprising:
    a viewing space in which observers are free to move among a plurality of viewing positions;
    a display device;
    a mirror with a concave reflective surface facing the display device; and
    a viewing window disposed between the concave reflective surface of the mirror and the viewing space,
    wherein the mirror is positioned for viewing by the observers through the viewing window,
    wherein light for an image generated by the display device is reflected off of the concave reflective surface towards the viewing window as substantially collimated light,
    wherein the display device is a flat panel display, and
    wherein the display system further comprises a correction optic positioned between the display device and the mirror, the correction optic having a convex surface directing the light for the image generated by the display device toward the concave reflective surface of the mirror and the directed light having an added field curvature based on a shape of the concave reflective surface of the mirror.

2. The display system of claim 1, wherein the display device is a flat panel display.

3. The display system of claim 2, wherein the flat panel display is a flexible flat panel display having a free-form shape.

4. The display system of claim 1, wherein the convex reflective surface of the correction mirror has a shape that is aspherical, paraboloid, hyperboloid, or free-form.

5. A display system for providing collimated projection effects, comprising:
    a viewing space in which observers are free to move among a plurality of viewing positions;
    a display device;
    a mirror with a concave reflective surface facing the display device; and
    a viewing window disposed between the concave reflective surface of the mirror and the viewing space,
    wherein the mirror is positioned for viewing by the observers through the viewing window,
    wherein light for an image generated by the display device is reflected off of the concave reflective surface towards the viewing window as substantially collimated light, wherein the display system further comprises a correction optic positioned between the display device and the mirror, the correction optic having a convex surface directing the light for the image generated by the display device toward the concave reflective surface of the mirror and the directed light having an added field curvature based on a shape of the concave reflective surface of the mirror,
    wherein the display device includes a projector projecting the light for the image, and
    wherein the correction optic comprises a projection screen.

6. The display system of claim 5, wherein the projection screen is a free-form projection screen with a prescriptive curve configured to match a shape of the focal surface of the mirror.

7. The display system of claim 5, wherein the projection screen is a high-gain screen.

8. The display system of claim 5, wherein the projector is a short-throw projector and the display device comprises an aspherical or free-form lens or mirror for distorting the light for the image prior to receipt by the projection screen.

9. The display system of claim 5, further comprising a correction plate disposed between the concave reflective surface and the viewing space and correcting for aberrations in the display system.

10. The display system of claim 9, wherein the correction plate comprises a Schmidt correction plate that is placed ahead of the center of curvature of the projection screen and of the center of curvature of the mirror.

11. The display system of claim 5, further comprising a meniscus correction plate disposed between the projection screen and the primary mirror so that the light for the image passes through the meniscus correction plate after being diffused from the projection screen and after being reflected by the concave reflective surface of the mirror prior to reaching the viewing window.

12. The display system of claim 1, further comprising a 3D Lenticular, varifocal, volumetric, multi-layer, light field or other autostereo display or projection at a focal surface adding dimensionality to a collimated scene at or near infinity.

13. A display system for providing collimated projection effects, comprising:
    a viewing space in which observers are free to move among a plurality of viewing positions;
    a display device;
    a mirror with a concave reflective surface facing the display device; and
    a viewing window disposed between the concave reflective surface of the mirror and the viewing space,
    wherein the mirror is positioned for viewing by the observers through the viewing window, wherein light for an image generated by the display device is reflected off of the concave reflective surface towards the viewing window as substantially collimated light, wherein the display device comprises a 3D lenticular, fly eye, or light field display providing the light for the image and configured to control aberrations in the collimated light, and wherein the display system further comprises a correction optic positioned between the display device and the mirror, the correction optic having a convex surface directing the light for the image generated by the display device toward the concave reflective surface of the mirror and the directed light having an added field curvature based on a shape of the concave reflective surface of the mirror.

14. The display system of claim 1, further comprising one or more polarization selective mirrors and flipped pancake optics to inline fold an optical path of the light for the image and make the display system more compact.

15. The display system of claim 1, further comprising a viewpoint tracker tracking the observer in the viewing space and, in response, modifying the light for the image.

16. The display system of claim 1, wherein the light for the image passes through an aperture provided by the viewing window and towards the observer such that the observer perceives imagery generated by the display device as a scene existing behind the aperture.

17. The display system of claim 16, further comprising a Schmidt or meniscus corrector plate in a polarization pancake optics to correct for aberrations, enable a large window size for the aperture, and provide a plurality of undistorted viewpoints.

18. The display system of claim 16, further comprising a light field display in polarization pancake optics to account for spherical aberrations, enable a large window size for the aperture, and provide a plurality of undistorted viewpoints.

19. A display system for providing collimated projection effects, comprising:
a viewing space in which observers are free to move among a plurality of viewing positions;
a display device;
a mirror with a concave reflective surface facing the display device; and
a viewing window disposed between the concave reflective surface of the mirror and the viewing space,
wherein the mirror is positioned for viewing by the observers through the viewing window,
wherein light for an image generated by the display device is reflected off of the concave reflective surface towards the viewing window as substantially collimated light,
wherein the display device is a flat panel display,
wherein the display system further comprises a corrective lens positioned between the flat panel display and the mirror, wherein the corrective lens receives the light for the image generated by the flat panel display and focuses light toward the concave reflective surface of the mirror into a curved image plane matching a focal surface of the concave reflective surface of the mirror, and
wherein the light for the image passes through a physical aperture provided by the viewing window and towards the observer such that the observer perceives imagery generated by the display device as a scene existing behind the aperture.

20. A display system for providing collimated projection effects, comprising:
a viewing space;
a display device;
a concave mirror with a reflective surface facing the display device; and
a viewing window disposed between the reflective surface of the concave mirror and the viewing space,
wherein the mirror is positioned for viewing by the observers through the viewing window,
wherein light for an image generated by the display device is reflected off of the concave reflective surface towards the viewing window for viewing by an observer in the viewing space, and
wherein the display system further comprises a transparent display positioned between the viewing window and the concave mirror operating to display images concurrently observable by the observer with the light for the image generated by the display device.

21. The display system of claim 20, further comprising a correction mirror positioned between the flat panel display and the concave mirror, wherein a reflective surface of the correction mirror receives the light for the image generated by the flat panel display and reflects light toward the reflective surface of the concave mirror with an added field curvature based on a shape of the reflective surface of the concave mirror.

22. The display system of claim 20, wherein the display device includes a projection screen and a projector projecting the light for the image onto the projection screen for diffusing prior to striking the concave reflective surface of the mirror.

23. The display system of claim 22, wherein the projection screen is a free-form projection screen with a prescriptive curve configured to match a shape of the focal surface of the mirror.

24. The display system of claim 22, wherein the projector is a short-throw projector and the display device comprises an aspherical or free-form lens or mirror for distorting the light for the image prior to receipt by the projection screen.

25. The display system of claim 22, further comprising a correction plate disposed between the concave reflective surface and the viewing space and correcting for aberrations in the display system.

26. The display system of claim 25, wherein the correction plate comprises a Schmidt correction plate that is placed ahead of the center of curvature of the projection screen and of the center of curvature of the mirror.

27. The display system of claim 22, further comprising a meniscus correction plate disposed between the projection screen and the primary mirror so that the light for the image passes through the meniscus correction plate after being diffused from the projection screen and after being reflected by the concave reflective surface of the mirror prior to reaching the viewing window.

28. The display system of claim 20, wherein the reflective surface of the concave mirror is separated a distance of less than 3 feet from the viewing window.

29. The display system of claim 20, wherein the concave mirror is a transparent mirror and wherein the display system further includes physical or virtual objects viewable by an observer in the viewing space through the viewing window and the concave mirror.

* * * * *